May 7, 1957 M. F. JACKSON 2,791,284
MULTIPLE FLUID PUMP AND MOTOR DRIVE SYSTEM FOR TRACTORS
Filed Feb. 14, 1952 8 Sheets-Sheet 1
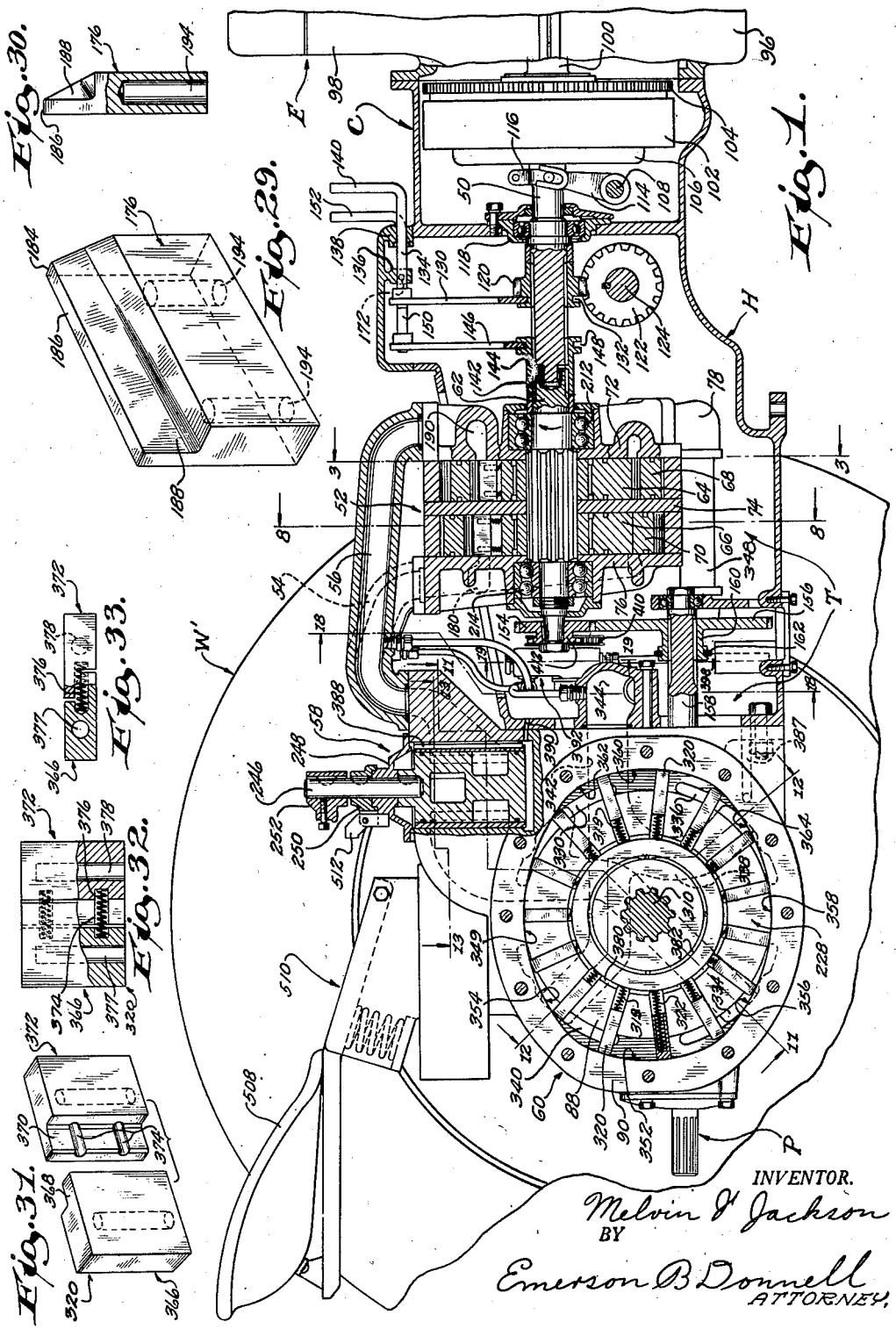
INVENTOR.
Melvin F. Jackson
BY
Emerson B. Donnell
ATTORNEY.

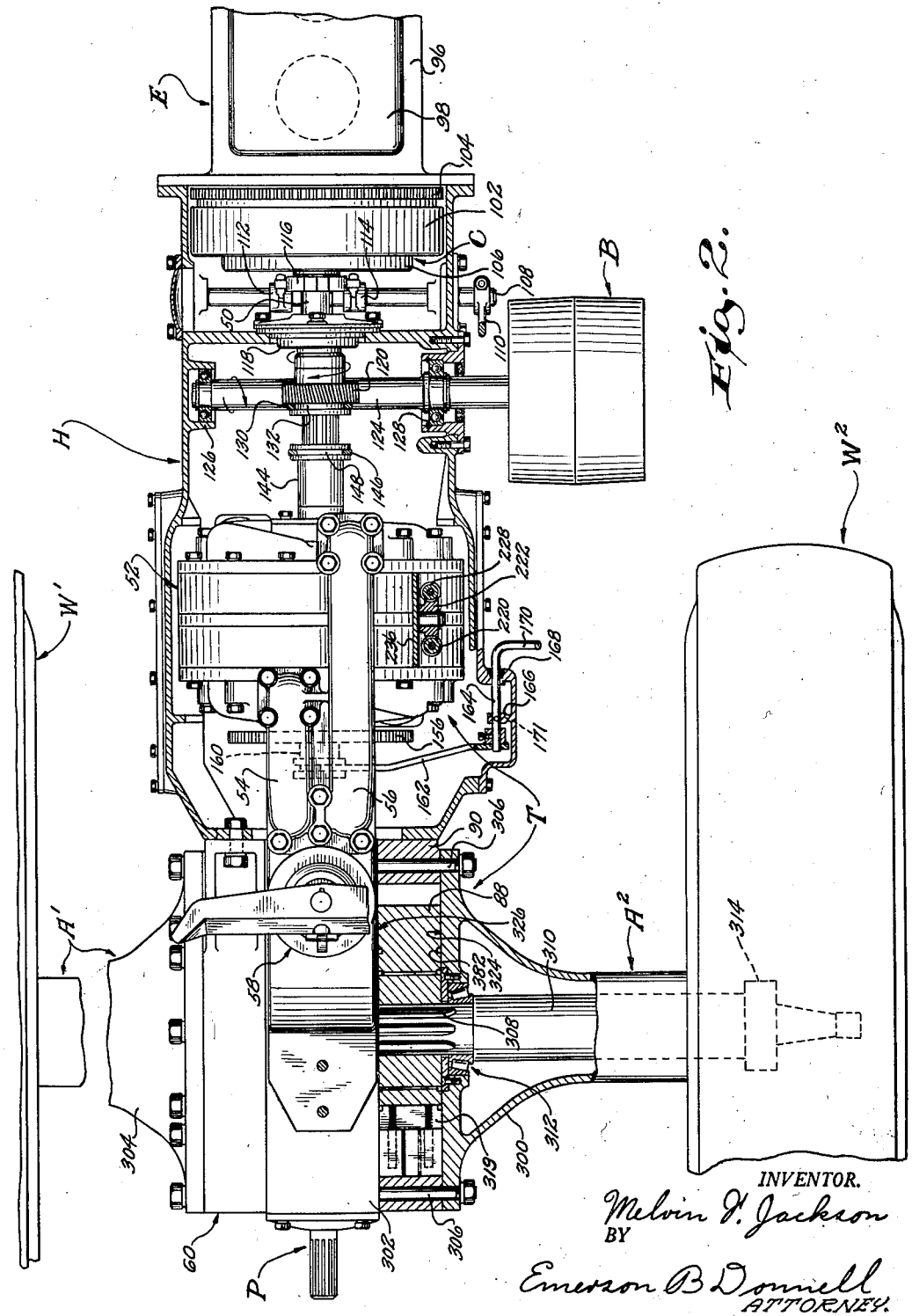

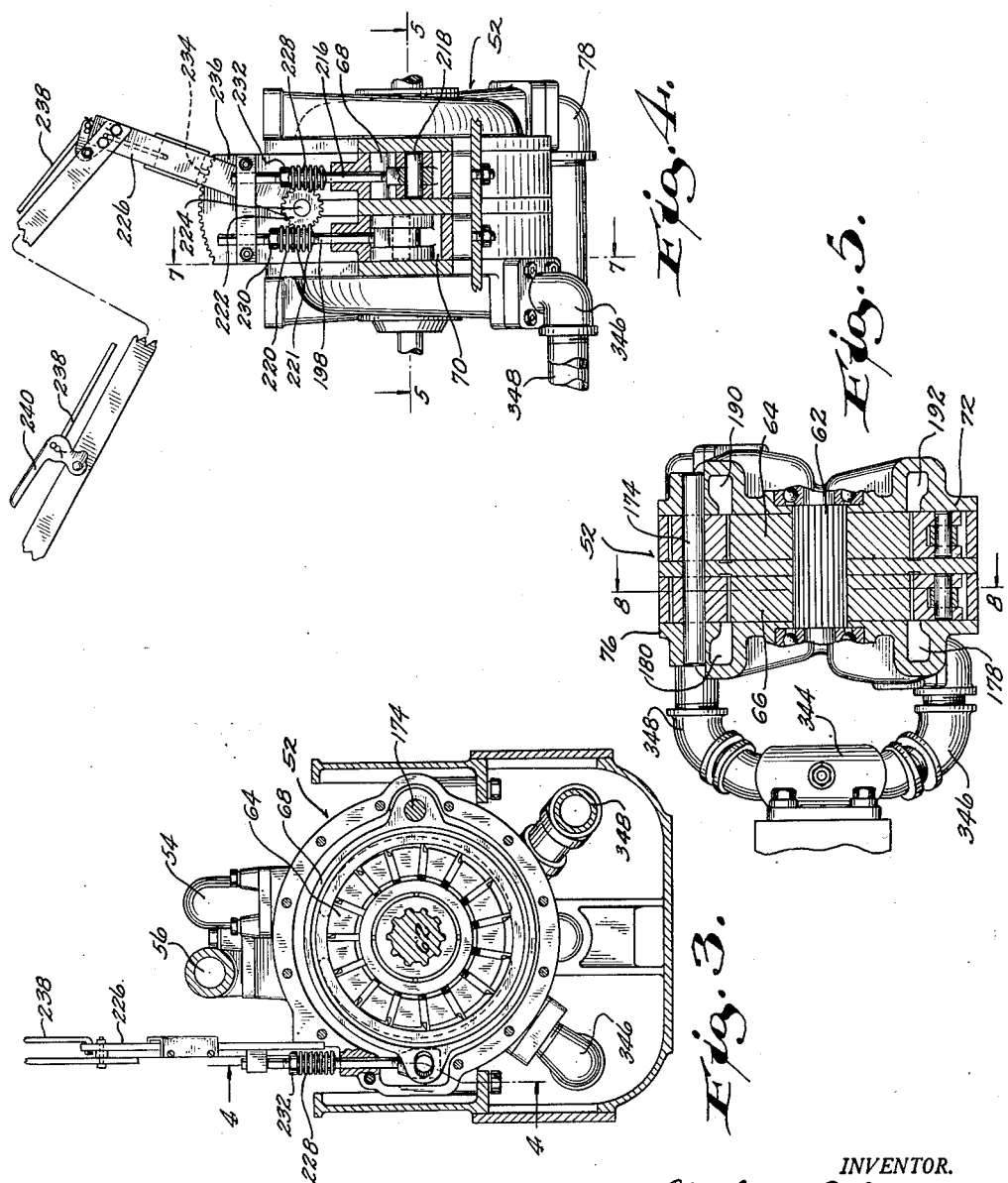

May 7, 1957    M. F. JACKSON    2,791,284
MULTIPLE FLUID PUMP AND MOTOR DRIVE SYSTEM FOR TRACTORS
Filed Feb. 14, 1952    8 Sheets-Sheet 4

INVENTOR.
Melvin F Jackson
BY
Emerson B Donnell
ATTORNEY.

May 7, 1957  M. F. JACKSON  2,791,284
MULTIPLE FLUID PUMP AND MOTOR DRIVE SYSTEM FOR TRACTORS
Filed Feb. 14, 1952  8 Sheets-Sheet 5
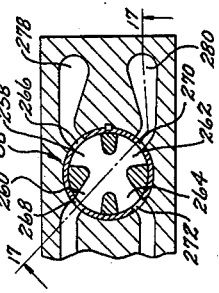
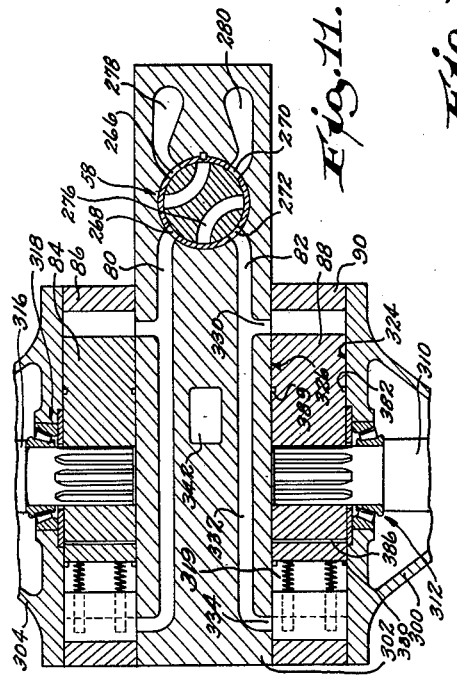
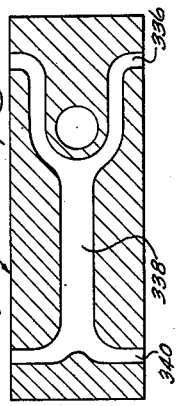
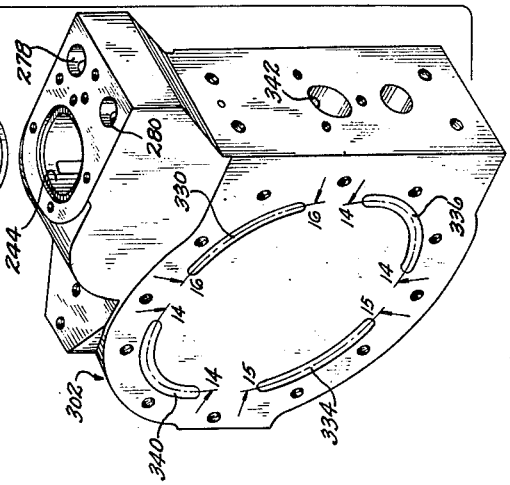
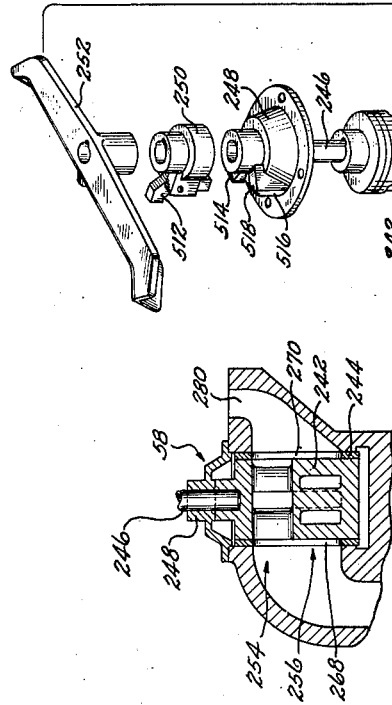
INVENTOR.
Melvin F. Jackson
BY
Emerson B Donnell
ATTORNEY.

May 7, 1957 M. F. JACKSON 2,791,284
MULTIPLE FLUID PUMP AND MOTOR DRIVE SYSTEM FOR TRACTORS
Filed Feb. 14, 1952 8 Sheets-Sheet 6
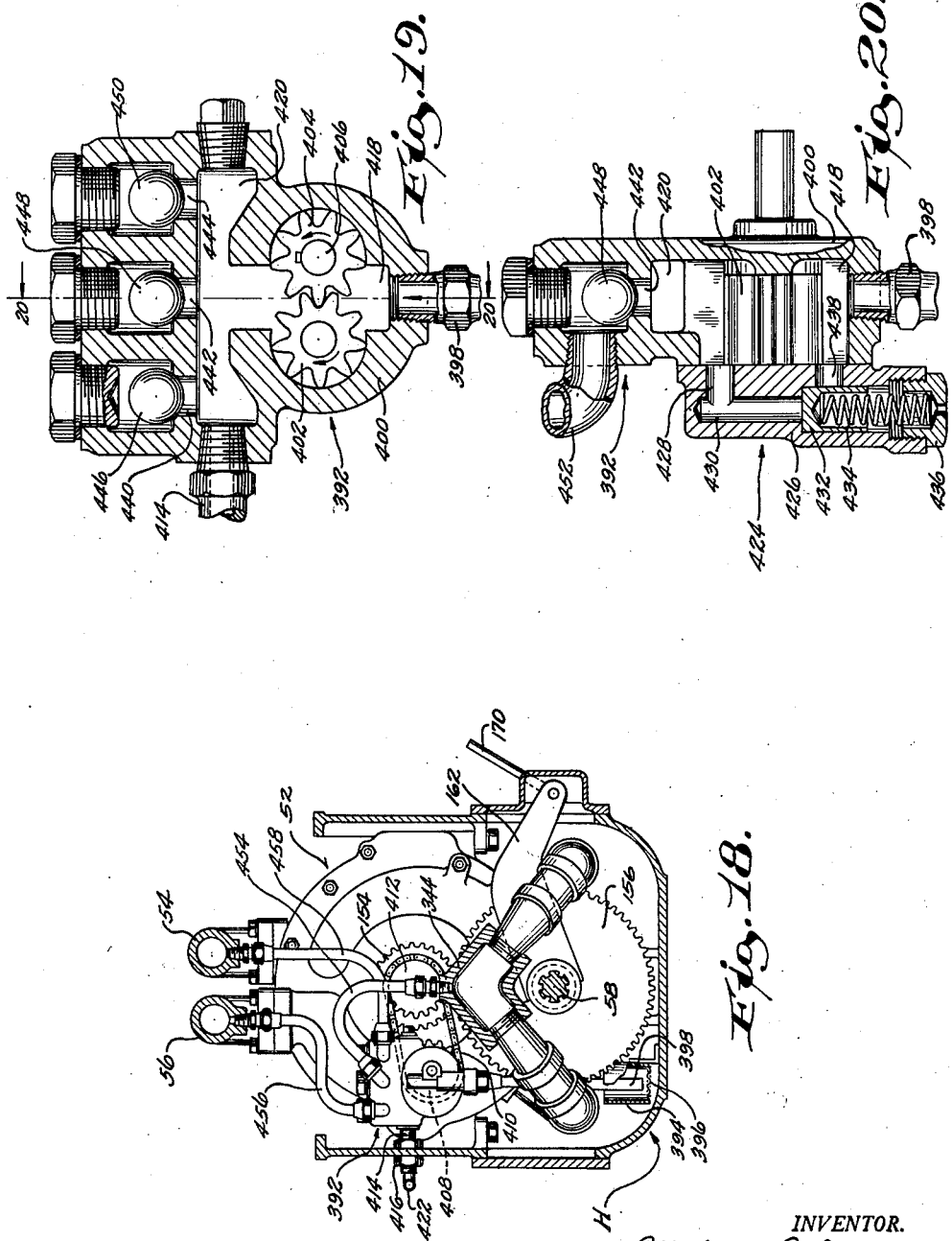
INVENTOR.
Melvin F. Jackson
BY
Emerson B Donnell
ATTORNEY.

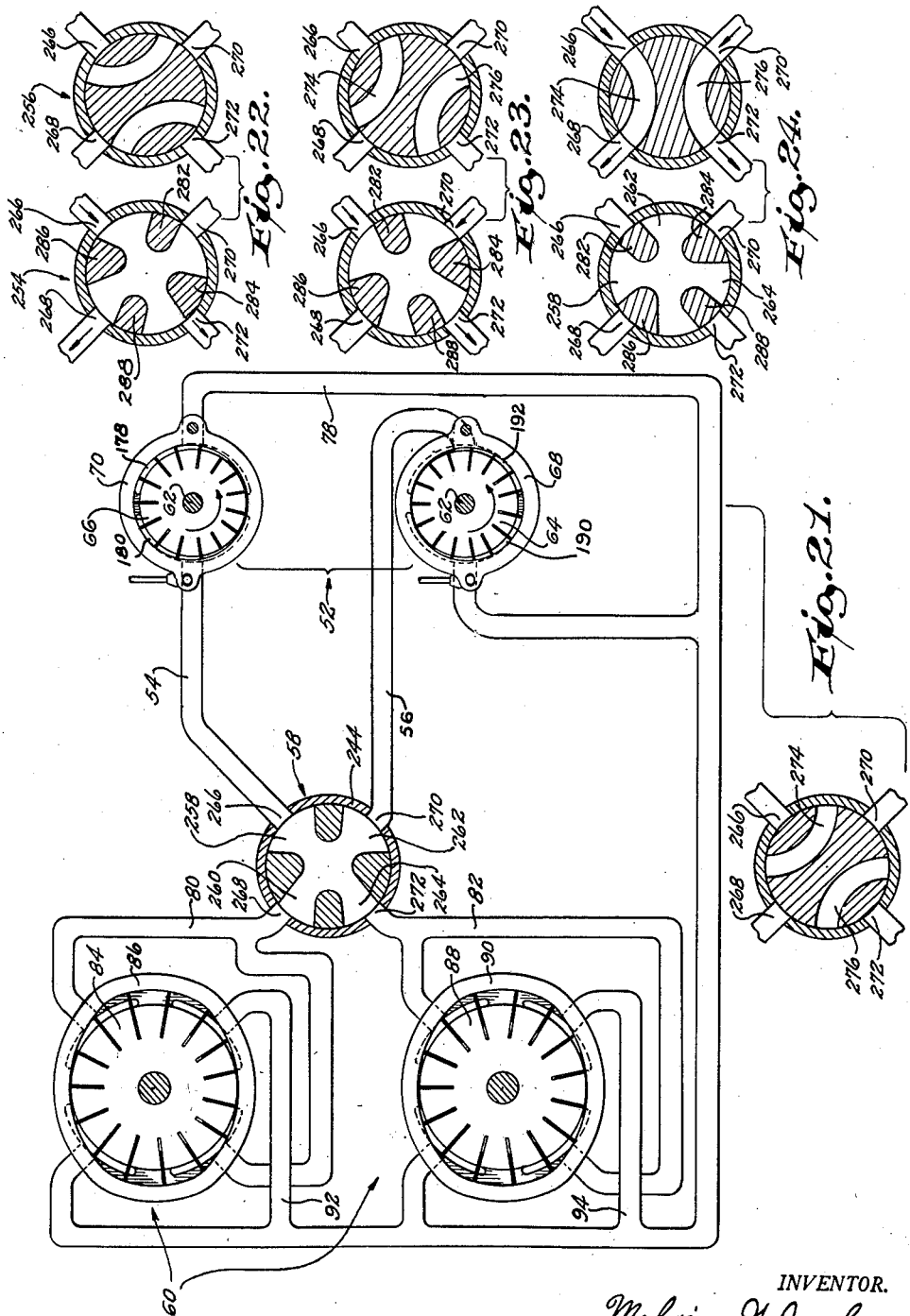

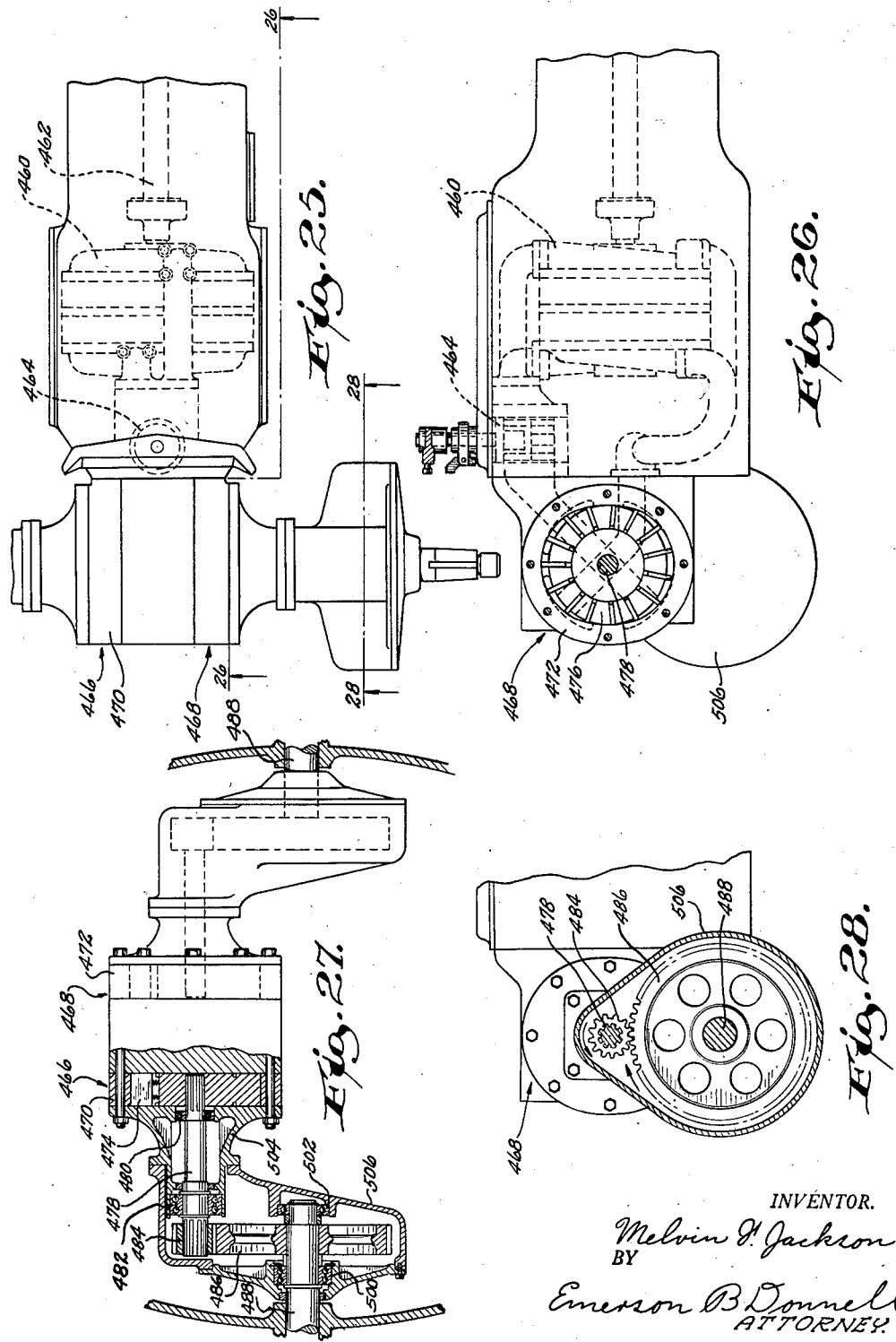

United States Patent Office 2,791,284
Patented May 7, 1957

2,791,284

MULTIPLE FLUID PUMP AND MOTOR DRIVE SYSTEM FOR TRACTORS

Melvin F. Jackson, Racine, Wis., assignor to J. I. Case Company, Racine, Wis., a corporation of Wisconsin Application February 14, 1952, Serial No. 271,493

8 Claims. (Cl. 180—6.48)

The present invention relates to tractors and particularly to the power transmission mechanism thereof, and an object of the invention is to generally improve the construction and operation of devices of this class.

Tractors are slow speed vehicles in which the necessary draw-bar pull is developed by an extreme reduction in revolutions per minute between the propelling engine and the traction wheels, a typical example calling for a speed of 1200 R. P. M. at the crankshaft of the engine and a speed of 26 R. P. M. at the rear axle or traction wheels. However, at times when the maximum draw-bar pull is not required, it is not necessary to run the engine at such a high rate, and a different rate of reduction is used, the engine being throttled or slowed down to obtain the desired rate of travel, which would otherwise be too fast. Three or four rates are commonly provided by means of a shiftable gear set, but often the most desirable ratio lies between two of those available and as a result it is necessary to use the next higher ratio or engine speed to the ideal, resulting in less than the highest possible efficiency. It is a major object of the invention to provide a transmission for such a vehicle which will give a multitude of ratios or a substantially infinitely variable ratio between the engine and the traction wheels.

A further object is to provide such a device which will eliminate a large number of parts common to the conventional transmission, and which in itself is made up of relatively few simple and inexpensive parts, not subject to excessive wear, or liable to failure.

A further object is to provide such a device which operates by means of fluid pressure, and to improve the units acting with the fluid pressure so as to reduce friction, inefficiency and wear to the lowest possible amount.

In tractors it is commonly necessary to have a differential drive between the traction wheels, but at times it is essential to provide for individual control of said wheels, as for example when making sharp turns, in which event one traction wheel is "braked" or retarded to assist in forcing the tractor to turn. Such tractors commonly have two traction wheels and the invention will be illustrated by means of such a tractor, but it is to be understood that the principles involved are equally applicable to tractors having more than two traction wheels, and it is not intended to limit the invention to tractors having two traction wheels, such a structure being chosen merely for convenience, and as typical. Furthermore, it is often desirable to avoid differential driving of the wheels when one wheel is on a slippery spot and spins freely and differential driving would prevent transmission of any effective torque to the other.

It is a further object of the invention to provide for independent driving of the traction wheels without a differential effect when desired, to provide for dividing the power between the traction wheels in any desired ratio, to provide a braking effect on either or both wheels, and to provide simple and easily managed controls for such a transmission.

A further object is to provide advantageous means for actuating such controls and for maintaining the requisite volume of fluid in the system, including expedients for collecting unavoidable leakage and returning it to the system.

A further object is to provide an improved arrangement of power take-off which will be capable of operation at a substantially constant rate independently of desired variations in forward travel of the tractor.

A further object is to provide for a belt pulley which is capable of operation at a substantially constant rate independently of desired variations in forward travel of the tractor.

A further object is to provide a transmission affording these advantages while being capable of operating the tractor with equal facility in either direction.

A further object is to provide for operation of a belt pulley while avoiding constant idle operation of any substantial portion of the traction mechanism.

Another object is to provide the mechanisms and expedients necessary for the realization of the above objects.

Further objects and advantages will be apparent from the following specification and accompanying drawings in which a satisfactory embodiment is shown, but it is to be understood that the drawings and description are intended to be exemplary rather than restrictive.

In the drawings,

Figure 1 is a vertical longitudinal sectional view with parts not relating to the invention removed and others broken away, of a tractor built in accordance with the invention;

Fig. 2 is a plan view of the same partly in horizontal section;

Fig. 3 is a vertical transverse sectional view on the line 3—3 of Fig. 1;

Fig. 4 is a sectional view of the parts shown in Fig. 3, taken on the line 4—4 of Fig. 3;

Fig. 5 is a horizontal sectional view taken on the line 5—5 of Fig. 4, with the parts in a slightly different position;

Fig. 10 is an "exploded" view, looking backwardly, downwardly and from the right, of certain parts indicated in Figs. 1 and 2;

Fig. 11 is a sectional view taken on the line 11—11 of Fig. 1;

Fig. 12 is a sectional view of the structure of Fig. 10 on the line 12—12 of Fig. 1;

Fig. 13 is a sectional view on the line 13—13 of Fig. 1;

Fig. 14 is a sectional development taken on the line 14—14 of Fig. 10;

Fig. 15 is a sectional development on the line 15—15 of Fig. 10, there being two separate portions of the part shown in Fig. 10 which are conveniently made identical and represented by Fig. 15;

Fig. 16 is a sectional development taken on the line 16—16 of Fig. 10;

Fig. 17 is a vertical sectional view taken on the line 17—17 of Fig. 13;

Fig. 18 is a vertical sectional view taken on the line 18—18 of Fig. 1;

Fig. 19 is an enlarged sectional view of an auxiliary pump taken on the line 19—19 of Fig. 1;

Fig. 20 is a vertical section of the same on the line 20—20 of Fig. 19;

Fig. 21 is a diagrammatic representation of the units of the variable speed transmission of the tractor showing particularly the fluid circuits;

Fig. 22 is a similar view of certain parts indicated in Fig. 21 shifted to a different position;

Fig. 23 is a similar view showing the parts in another position;

Fig. 24 is a similar view showing the parts in still another position;

Fig. 25 is a plan view of a modified tractor construction embodying the invention;

Fig. 26 is a vertical sectional view on the line 26—26 of Fig. 25;

Fig. 27 is a rear elevation of the embodiment shown in Fig. 25 with parts broken away and others omitted, to avoid confusion;

Fig. 28 is a vertical sectional view on the line 28—28 of Fig. 25;

Fig. 29 is an enlarged perspective view of a vane indicated in Figs. 1, 3, 8 and 9;

Fig. 30 is an end elevation of the same partly broken away;

Fig. 31 is an enlarged perspective view of complementary block portions which are adapted to be assembled to form a vane indicated in Figs. 1, 2 and 11;

Fig. 32 is a front elevation with parts broken away of an assembled vane such as indicated in Fig. 31; and Fig. 33 is an end view of the same partly broken away.

General description

Figure 8:
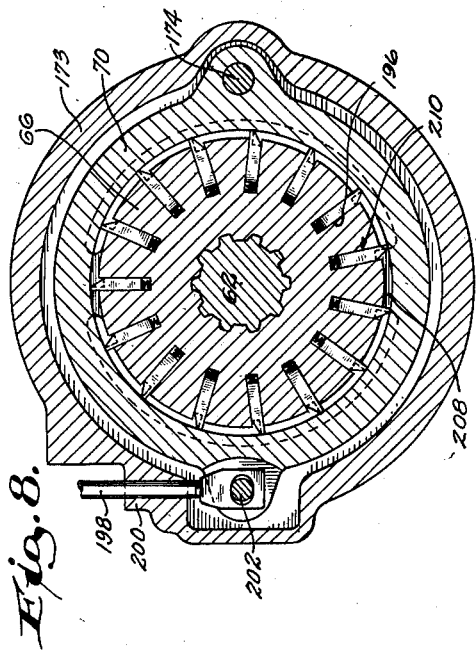
Fig. 8 is an enlarged vertical transverse sectional view similar to Fig. 3 with parts removed, taken on the line 8—8 of Fig. 1 showing a "neutral" position.

Referring to Figs. 1 and 2 the tractor illustrative of this invention has an engine generally designated as E, a clutch C, a transmission T, traction wheels $W^1$ and $W^2$, a power take-off shaft P, and a belt pulley B. Wheels $W^1$ and $W^2$ are carried by axle housings $A^1$ and $A^2$ in well-known manner not necessary to further describe, and housings $A^1$ and $A^2$ are connected to engine E by means of a housing H which encloses most of the parts of the transmission mechanism T and unites the whole into a unitary assembly as is common in tractors generally.

Certain features which are conventional and well-known to all tractors, such for example as the front wheels, steering gear, details of the engine, etc., all of which may be of any well-known type insofar as the invention is concerned, are to be understood to be included but have been omitted from the disclosure for the sake of simplicity.

In the present instance, engine E drives, through above mentioned clutch C, a clutch shaft 50 which as will be more fully described actuates a duplex hydraulic pump generally designated as 52. Pump 52 supplies fluid pressure through conduits 54 and 56 to a control valve generally designated as 58 which distributes the pressure fluid to a duplex fluid motor generally designated as 60.

For the best understanding of the invention, reference is also made to Fig. 21. Clutch shaft 50 drives, through intermediate mechanism which will be described presently, a main input shaft 62 of above mentioned pump 52 on which are mounted rotors 64 and 66 rotatable within stators 68 and 70 respectively. Rotor 64 and stator 68 are received in fluid tight relation between head 72 and a dividing wall 74, while rotor 66 and stator 70 are also received in fluid tight relation between above mentioned dividing wall 74 and a rear head 76. Rotor 64 and stator 68 cooperate in a manner which will be further described to force pressure fluid from a supply pipe or manifold 78 to above mentioned pipe or conduit 56, while rotor 66 and stator 70 cooperate to force pressure fluid from above mentioned manifold 78 into above mentioned pipe or conduit 54. The two streams of fluid in pipes 54 and 56 enter valve 58 whence they are distributed in one or another of various ways, as will be further described, between passageways 80 and 82 (see also Fig. 11) leading respectively to a cooperating rotor 84 and stator 86, and to a cooperating rotor 88 and stator 90, rotors 84 and 88 being individual to and connected in driving relation with wheels $W^1$ and $W^2$ respectively. Spent pressure fluid from stators 86 and 90 finds its way to branches 92 and 94 of manifold 78, and returns to pump stators 68 and 70, the flow of fluid in this manner causing rotation of rotors 84 and 88 and driving of traction wheels $W^1$ and $W^2$.

The fluid delivered by rotors 64 and 66 of duplex pump 52 may be precisely regulated in volume in a manner to be described and, as will be apparent, the ratio of revolutions of the pump to revolutions of the motor rotors accurately controlled. The fluid from both pump rotors 64 and 66 may be intermingled in valve 58, in which case it will divide between rotors 84 and 88 in accordance with the speeds thereof for a differential driving effect, or if desired the two streams may be kept separated in valve 58, all as will be described in detail, so that the fluid will be divided between the rotors 84, and 88 substantially equally even in the event that one rotor is without substantial resistance to rotation. This condition might arise for example if one traction wheel were free to slip, in which condition the conventional tractor would be helpless even though the other wheel had satisfactory traction.

Additional control may be obtained through valve 58, which may be manipulated to block, or partially block the flow of pressure fluid through one or the other of stators 86 or 90 which will introduce a braking effect on the corresponding traction wheel so as to assist in certain maneuvers, such as turning sharply to the right or left.

It is a feature of the device disclosed that the tractor equipped with it operates with about equal facility either forward or backward. This is particularly convenient in the use of certain attached implements which require the tractor to run backward when the implement is operating. With a conventional tractor it is necessary to reverse the position of the usual driven bevel gear in order to obtain even the usual variety of speed ratios in this reverse direction. With the present transmission substantially continuous variation of the speed ratio is equally available in either direction of operation.

Detailed description

Returning to a more complete description of the illustrative mechanism, engine E is of well-known type including the usual crank case 96, cylinder block 98, crank shaft 100, and flywheel 102, the latter carrying a starter gear 104 of suitable type. Flywheel 102 includes within itself most of the working parts of clutch C which may be of any type suitable or usual for use on tractors within the contemplation of the invention, and which therefore need not be further described except to say that it has a housing portion 106, and may be thrown into and out of engagement by means of a rock shaft 108 journaled in housing H and rockable by means of a control 110, Fig. 2. Rock shaft 108 has shipper forks 112 and 114 which engage and shift a throwout bearing 116, connected in well-known manner with the mechanism within flywheel 102 and housing 106 so that rocking of rock shaft 108 by means of control 110 will cause establishment or interruption, as desired, of driving relation between crank shaft 100 and above mentioned clutch shaft 50.

Shaft 50 extends rearwardly through a suitable bearing 118 and has slidably keyed thereon a spiral or other suitable gear 120 engaged with a cooperating gear 122 fixed in relation to a shaft 124 carrying above mentioned belt pulley B, shaft 124 being carried in suitable bearings 126 and 128 supported in the walls of housing H. Gear 120 may be shifted axially of shaft 50 by means of a shifter fork 130 engaged in a groove 132 and fixed in relation to a shifter rod 134 slidable in bosses 136 and 138 supported in housing H. Rod 134 has a handle portion 140 by means of which it can be readily reciprocated with the result of shifting gear 120 into and out of mesh with gear 122. In this way belt pulley B may be caused to run whenever clutch C is engaged, or may be disconnected from clutch C as desired.

Shaft 50 has a pilot bearing 142 in above mentioned input shaft 62, and a collar or clutch element 144 is slidably keyed on shaft 50 and shiftable into slidable but non-rotative engagement with shaft 62 so as to connect shafts 50 and 62 or to disconnect them when desired. A shifter work 146 engages a grove 148 in collar 144, and is fixed in relation to a rod 150 slidable in a manner similar to above mentioned rod 134, and having a handle portion 152 by means of which, through fork 146, collar 144 may be shifted. It is therefore possible to avoid continuous operation of pump 52 when it is not needed, as, for example, when the tractor is to be used in a stationary position for actuating an implement by means of belt pulley B.

*Power take-off*

Shaft 62 continues rearwardly through pump 52 and beyond the latter has a gear 154 fixed thereon and meshing with a gear 156 slidably keyed on a shaft 158 constituting above mentioned power take-off P. Gear 156 has a grooved hub portion 160 engaged by a shifter fork 162 carried on a rod 164 slidable in a bracket 166 and a wall portion 168 of housing H. Rod 164 has a handle portion 170 by which it may be shifted axially, thus moving shifter 162 and shifting gear 156 into or out of engagement with gear 154. Power take-off shaft P may accordingly be caused to run whenever pump input shaft 62 is actuated and regardless of the adjustment of pump 52 and accordingly of the rate of progress of the tractor. Power take-off P is accordingly independent of the forward motion and may continue to run at a steady rate while the movement of the tractor is varied or discontinued altogether, this resulting in substantial advantages under certain types of operation of the tractor. For example in actuating a harvesting machine which has mechanism which must be operated at a steady speed but where the rate of progress governs the intake of material, engine E and power take-off P may run at a governed speed (which is customary) while the forward progress may be completely controlled from maximum to stand-still by adjustment of pump 52. Suitable or well-known detent means 171 is contemplated for maintaining shifter rod 164 in adjusted positions and means 172 is contemplated in connection with shifter rods 134 and 150.

*Pumps and adjustments*

Figure 9:
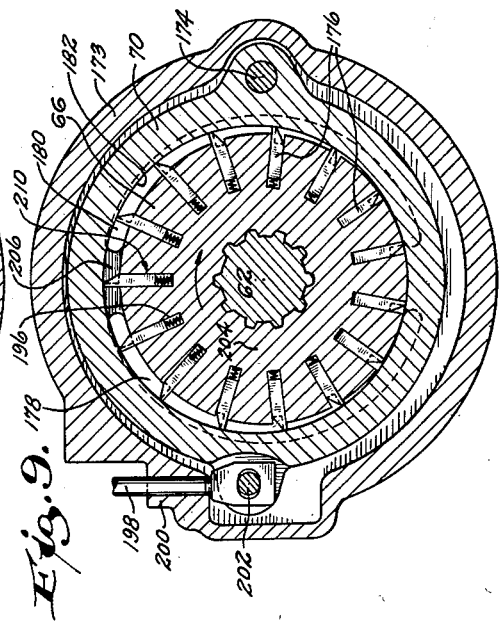
Fig. 9 is a similar view of the same parts in an operating position.
Figure 6:
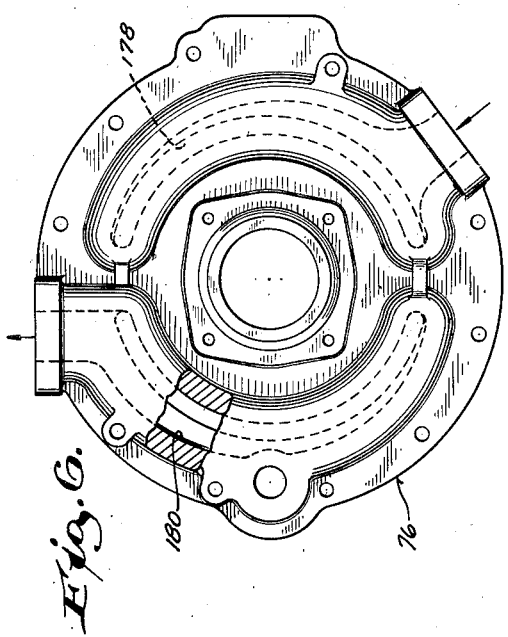
Fig. 6 is a rear elevation of a cover plate or head indicated in Fig. 4.

Referring to Figs. 1, 8 and 9, the pump is in reality a duplex unit having two pumping chambers in a single casing. Above mentioned rotor 66, Fig. 9, is preferably identical with rotor 64, Fig. 1, and the principle of operation of the two is the same so that it will be necessary to describe in detail only one. As seen in Fig. 9, rotor 66 is disposed accurately on the axis of an outer or housing ring 173 and remains concentric therewith at all times. Within ring 173, however, is above mentioned stator 70 which constitutes a shiftable casing for rotor unit 66. As seen in Fig. 9, stator 70, which is journaled on a pivot 174, has been shifted upwardly a maximum possible amount so that rotor 66 is in effect downwardly displaced or eccentric to stator 70. A plurality of vanes or abutments 176—176 extend outwardly from rotor 66 into contact with the inner surface of stator 70, which surface is suitably finished for continuous sliding contact of said vanes. As rotor 66 rotates, the spaces between vanes 176 expand and contract, in Fig. 9 drawing fluid in between them through a circumferentially extending slot or port 178 in head 76 and expelling it through a similar port 180 communicating directly with above-mentioned conduit 54.

Vanes 176 as more particularly shown in Figs. 29 and 30 are formed of materials suitable for running in frictional contact with a surface 182 of stator 70, various metals being suitable and hard wood having been found to operate satisfactory. Each vane has a rectangular or wafer-like contour and is tapered at one edge as at 184 to a narrow contacting surface 186. At the end remote from 184 the tapered surface is cut away as at 188. The vanes are made both as shown in Fig. 29 and in the reverse, or with cut-away portion 188 at the opposite end, vanes of the type shown in Fig. 29 being used with rotor 64 and the opposite type with rotor 66. The cut-away portion 188 of each vane is directed toward the ports 178 and 180 co-acting with rotor 66 and with similar ports 190 and 192, Fig. 5, cooperating with rotor 64. Vanes 176 are also provided with recesses 194—194 within which springs 196—196, Fig. 9, are compressed to continuously maintain vanes 176 outwardly against surface 182. Cut-away portions 188 provide for the utmost possible freedom of entrance and exit of fluid between ports 178 and 180 and the spaces between vanes 176—176. The volume of fluid pumped by the arrangement is proportional to the degree of offset or eccentricity between rotor 66 and stator 70 and this may be adjusted by means of a stem 198 slidable in a portion 200 of housing 173 and connected with stator 70 by suitable means such as a pin and slot connection 202. Vertical movement of stem 198 will cause pumping, as in Fig. 9, assuming clockwise rotation of rotor 66 as indicated by the arrow 204, from port 178 to port 180. Downward movement of stem 198 to the Fig. 8 position will result in a cessation of any pumping and furthermore, assuming substantially incompressible fluid, such for example as oil, while rotor 66 may continue to run, flow of fluid from port 178 to port 180 is virtually blocked or prevented since there is no expansion or contraction of the spaces between vanes 176 under this condition. It will be apparent that further downward movement of stem 198 will result in eccentricity between rotor 66 and stator 70 in the opposite direction from that shown in Fig. 9. The expanding spaces between vanes 176 will then be in communication with port 180 while the contracting spaces will be in communication with port 178. As a result fluid will then be pumped from port 180 to port 178, reverse rotation thus being brought about in any fluid motor or motors connected with this section of the pump at the time.

As stated rotor 64 rotates within casing 68 in a manner substantially identical to that just described, the only difference being that the ports 178 and 180 cooperating with rotor 66 are at the left as seen in Fig. 1 while the corresponding ports 190 and 192 cooperating with rotor 64 are at the right as seen in Fig. 1.

Figure 7:
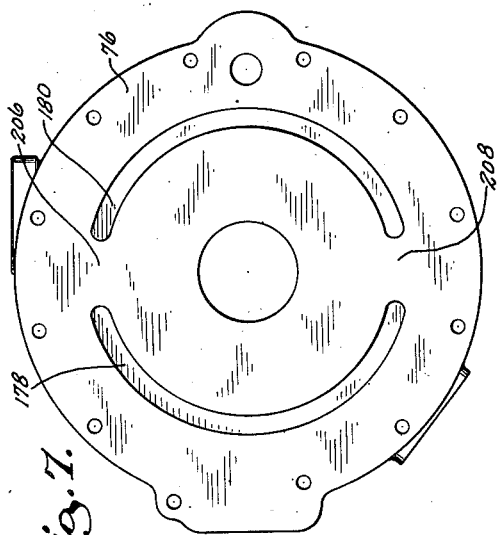
Fig. 7 is an elevation of the same part taken from the front or face as for example on the line 7—7 of Fig. 4 with parts removed.

Ports 178 and 180 as best shown in Fig. 7 are separated by plane surfaces 206 and 208 which separate the circumferential ends of the ports. These surfaces are continuous with the face of head 76 against which stator 70, rotor 66 and the ends of vanes 176 are slidable in substantially fluid tight relation. In operation, as will be understood, working pressure or high pressure will be present in one of the ports, for example port 180, while comparatively low pressure will be present in port 178 under these conditions. Fluid has free access to both sides of all vanes communicating with port 180 as seen in Fig. 9 and the pressure will be equal on all sides thereof with the exception of which ever vane as 210 happens at the instant to be in contact with surface 206. This vane will have high pressure on one side and low pressure on the other. This situation changes as other vanes come into this position, the force being transferred from one to the next as rapidly as the vanes pass beyond surface 206 into juxtaposition with port 180.

It is to be noted that each vane, as it passes through the region between the high and the low pressure ports, is in a position where it has very little movement in and out of its respective rotor, resulting in a minimum of friction loss and wear.

The high pressure is excluded from port 178 by one or another of the vanes in contact with port 206. In the position shown in Fig. 9, rotor 66 seals the high pressure from port 178 by direct contact with surface 182 in the region of surface 208. In other settings of the parts one or another of vanes 176 seals the pressure against escape into port 178 through cooperation with surface 208 in a manner similar to that just described in connection with surface 206. As will be apparent, one side, so to speak, of rotor 66 is subjected to very substantial fluid pressure while the other side is not. As a result there is a strong tendency for the rotor to be displaced (toward the left in Fig. 9) and which pressure must be resisted in some manner.

As has been pointed out, rotors 66 and 64 are identical and close to each other on shaft 62. The connections with motor 60, as will be fully described, are such that, in order to obtain the desired direction of rotation, stator 70 is displaced in one direction, for example upwardly, resulting in a side thrust of rotor 66 toward the left as seen in Fig. 9, while stator 68 is displaced downwardly, resulting in a side thrust to the right, considered from the same viewpoint as Fig. 9. We thus have reactions against rotors 66 and 64 which are substantially equal and substantially in opposite directions thus relieving the supporting parts of a very considerable amount of stress which otherwise would be imposed thereon. Above mentioned shaft 62 is carried in very rugged bearings 212 and 214 mounted respectively in heads 72 and 76 but, as stated, these bearings are relieved from most of the side thrust caused by the fluid pressure on the sides of the pump rotors, since one rotor balances the other, any slight remaining unbalanced force being resisted by bearings 212 and 214. Any such force is very small compared to what it would be if the entire reaction were exerted in one direction.

In carrying out this action, mechanism is provided for displacing stators 68 and 70 in opposite directions. Referring to Figs. 3, 4 and 5, above mentioned stem 198 has a counterpart in a stem 216 which is also connected by a pin and slot connection 218 with stator 68. Stem 198 has a cylindrical rack element 220 comprising a series of equally spaced disk-like collars 221—221, engaged with a gear 222 as more particularly shown in Fig. 2, rotatable about a shaft 224 in response to rocking of a lever 226. Forward rocking of lever 226 will accordingly cause raising of rack 220 and stem 198 while rearward rocking will cause lowering of stem 198 as will be apparent. Gear 222 also engages a cylindrical rack 228 of similar or identical type fixed on stem 216. As will be apparent, movement in one direction will be accomplished by equivalent movement of the other stem but in the opposite direction. Racks 220 and 228 form a convenient means of obtaining precise adjustment of the relation between the stators 68 and 70. For this purpose racks 220 and 228 are threaded respectively on stems 198 and 216, the adjustment being held by lock nuts 230 and 232. Lever 226 has a detent 234 engageable with a quadrant 236 and controlled by a linkage 238 from a handle 240 whereby lever 226 may be maintained in any desired position within the limits of its movement and readily released and shifted when desired. Virtually the entire control of the forward or backward movement of the tractor is centered in this lever. For any desired setting of lever 226, stator 70, for example may be accurately adjusted up or down by loosening lock nut 230 and adjusting rack 220. The same is true in relation to stator 68.

It will be noted that a somewhat similar displacing reaction will be exerted against the stators 68 and 70 but which reactions also tend to balance each other, as will be described. Considering first stator 70 as seen in Fig. 9, all the spaces between the vanes 176 to the right of a vertical plane containing the center line of shaft 62 are under comparatively high pressure, while all those at the left of such a plane are under low pressure. The resultant of all these individual areas of pressure will be a substantial urge to the right against the pin 174, but, since stator 70 has been displaced upwardly, this force will not be symmetrical with pin 174 but, in the relation shown, will be slightly above it. Thus there will arise a couple tending to further rotate stator 70 in a clockwise direction about pin 174. Such rotation, unless stator 70 is already at the limit of its travel, will tend to throw the rotor into extreme eccentric position once it has been displaced the least bit from a central or neutral position such as shown in Fig. 8. On the other hand, in the case of stator 68, which, as shown in Fig. 3, is displaced downwardly under the same conditions, the spaces to the left of a vertical plane through the center line of shaft 62 will be under high pressure while those to the right of such plane will be under low pressure. This will result in a force exerted on stator 68 toward the left as seen in Fig. 3. However, in this case the force is centered in a horizontal plane slightly below pin 174, resulting in a couple tending to rotate stator 68 also in a clockwise direction, or toward a concentric or neutral position, which, it will be apparent, is the opposite of the action of stator 70, which tends to be forced to its extreme eccentric position.

This general relation will exist regardless of the direction of displacement of the stators, because of the side of shaft 62 on which the pressure is exerted. In other words, one stator will tend to go to its extreme eccentric position, while the other stator will tend to return to a concentric position. Reference to Fig. 4 will show that movement of either stator to either of its extreme positions, up or down, will be resisted, through racks 220 and 228 and pinion gear 222 by the tendency of the other stator to move to a central position.

A further advantage of this action is the elimination of any slack or lost motion between the circular racks 220 and 228 and gear 222, as well as between stems 198 and 216 and their respective connections 202 and 218.

Other factors enter into the functioning of the control, for example the friction of the vanes on the inner surfaces of the stators, which tends to shift both stators in an upward direction, and the pressure of springs 196 which tends to shift both stators to a central or neutral position. Another factor is the resistance to flow of fluid into and out of the spaces between vanes 176, which may give rise to a pressure increase between one space and the next as the spaces get smaller. This would also tend to shift the stators to central or neutral position.

It has been observed in practice that the factors tending to shift the stators to neutral tend to predominate so that mechanism such as detent 234 and rack 236 is necessary to maintain the stators in adjusted position.

*Selector valve*

Valve 58, as more particularly shown in Figs. 1, 10, 13, and 17, has two levels, an upper and a lower, with different porting arrangements for providing a choice of operation. It comprises a generally cylindrical plug portion 242 rotatable in a sleeve 244 and having a substantially fluid tight fit therein, said plug being rotated by a stem 246 journaled in cap 248, a control fitting 250 being fixed on stem 246 and a control bar 252, in the present instance foot operated, being fixed on stem 246 above fitting 250. The upper level of valve 58 has been generally designated as 254 while the lower level has been designated as 256, it being understood that both portions work with the high pressure fluid as distinguished from the low pressure or spent fluid, at such times as the tractor is running in a forward direction, although, as will be presently apparent, the peculiar advantageous operation of the system is substantially the same whether valve 54 is introduced in the high or the low pressure side of the fluid circuit.

As best seen in Figs. 1, 11, 13, 17 and 21 to 24, inclusive, upper portion 254 of valve 58 has ports 258, 260, 262 and 264, which may register simultaneously with ports 266, 268, 270 and 272, respectively in sleeve 244, ports 258, 260, 262 and 264 intercommunicating within plug 242. Lower section 256, on the other hand is provided with ports 274 and 276 which constitute separate passageways through plug 242 and which do not intercommunicate. Ports 266, 268, 270 and 272 are elongated, and of sufficient extent to register with either the upper ports 258, 260, 262 and 264, or with ports 274 and 276, and therefore may control the flow between ports 266 and 268 on the one hand, and between ports 270 and 272 on the other. Motor 60 being of the positive displacement type, it follows that various advantageous modes of operation can be obtained by shifting valve 58 to various positions.

Passageway 54 communicates with a cored extension 278, Figs. 11 and 13, which in turn communicates with port 266, while passageway 56 communicates with a cored extension 280 communicating with port 270. Thus the streams of fluid from individual pump rotors 66 and 64 are delivered separately and independently through passageways 54 and 56 to ports 266 and 270. Furthermore, ports 268 and 272 communicate with above mentioned passageways 80 and 82, respectively, which lead, as hereinbefore described to motor rotors 84 and 88. Assuming displacement of stators 70 and 68, fluid will be displaced by rotors 66 and 64, and pumped in virtually identical quantities into passageways 54 and 56, and accordingly into extensions 278 and 280. With the valve 58 in the position shown in Figs. 13 and 11, which show, respectively, the upper section 254 and the lower section 256, the two streams of fluid will be mingled in ports 258 and 262, and transmitted through ports 260 and 264 to passageways 80 and 82 and thus to rotors 84 and 88. Since the fluids are intermingled, it will be apparent that the fluid pressure applied to the two rotors will be identical, or substantially so, so that the torque developed by the fluid motors and applied to the driving wheels or units will be the same. Since the motors are of the positive displacement type, the volume of fluid passing through the motors will be in accordance with the number of revolutions of the rotors, and the fluid in valve 58 will divide between passageways 80 and 82 in accordance with the rate of rotation, and therefore in accordance with the rate of acceptance of fluid by the rotors 84 and 88. A differential effect is therefore produced in which each traction unit exerts equal effort and may drive at a different rate than the other unit if the tractor is traveling in a curve, or if necessary for any other reason. It follows that, if one wheel or unit loses traction, it will rotate freely at a rapid rate and accept all the fluid supplied by both pumps while preventing the building up of any substantial pressure, since it will require very little pressure to actuate the traction unit which has no traction. This is the hydraulic counterpart of what happens with the ordinary mechanical differential under similar circumstances.

Turning to Fig. 24, a position of valve 58 is shown which would be suitable for overcoming this condition, and which would be advantageous when operating under conditions where one or the other traction unit would be likely to lose traction from time to time. In this position it will be noted that port 258 of the upper portion 254 of the valve has been shifted until it no longer registers with port 266, the latter being blocked by the solid portion 282 of the valve between ports 258 and 262. In similar manner port 270 is blocked by the solid portion 284 between ports 262 and 264 while ports 268 and 272 are similarly blocked by solid portions 286 and 288 respectively. The hereinabove described differential effect is therefore prevented as in fact is all fluid flow insofar as the upper portion of the valve is concerned. Such positioning of the valve, however, also positions the lower portion 256 of the valve as also seen in Fig. 24 so that port 274 registers with ports 266 and 268, thereby connecting conduit extension 278 with passageway 80 so that the entire output (neglecting unavoidable slight leakage or slip) of pump rotor 66 is compelled to pass to motor rotor 84. In similar manner port 276, in this position of the valve registers with ports 270 and 272 and thereby connects conduit extension 280 (Fig. 13) with passageway 82 so that the output of pump rotor 64 is connected exclusively with rotor 88. In other respects the transmission operates as before, but it will now be apparent that, if one traction unit is on a slippery spot so that it suffers little or no resistance to turning it will rotate freely without the development of any substantial pressure in its respective pump and motor, as before, but this will in no way affect the development of pressure by the other pump. Thus pressure will be developed in the motor connected with the traction unit which does have traction so that the tractor will be moved by the latter traction unit into a more favorable position where both units will presumably have traction.

In a word the operation will be similar to that of a "locked" differential, except that, because of the slight unavoidable leakage or "slip" a limited differential effect will be present. The tractor will therefore have the advantages of a tractor having a solid rear axle when such operation is desirable, but will be more readily steered under these conditions than such a tractor.

Valve 58 may also be used as a steering or steering assisting means by diverting the pressure fluid more to one motor than to the other as will now be described. Referring to Fig. 23 it will be noted that ports 274 and 276 in the lower portion 256 of the valve have been shifted so that they fail to register with any of ports 266, 268, 270 or 272 so that flow of fluid through the lower portion of the valve is blocked. Upper portion 254 has of course also been shifted, but, unlike the condition of Fig. 24, portion 282 of the valve does not block port 266. Portion 286 however, does block port 268, while port 272 is left open since portion 288 has not been moved sufficiently to close it as was the case in Fig. 24. In this manner, as will be apparent, all the fluid from both pump rotors 66 and 64 will be mingled and transmitted through port 272 and passageway 82 to motor rotor 88. In this manner all the driving force is transmitted to the traction unit connected with rotor 88.

In Fig. 22 the valve is shown shifted in the opposite direction from that indicated in Fig. 23 so that fluid is transmitted through port 268 to motor rotor 84, but in this instance the valve has not been moved so far. Portion 284 now partially, but not entirely blocks port 272 so that a throttling effect is produced and the flow of fluid into passageway 82 is restricted. In this position rotor 84 will receive the full fluid pressure while a substantial pressure drop will be produced at port 272. As a result, rotor 88 will develop less torque than rotor 84, which will tend to make the tractor turn in a direction away from the traction unit connected with rotor 84. It will be apparent that the parts might be shifted further to the position corresponding but opposite to that of Fig. 23, in which case port 272 would be blocked and all the fluid would be transmitted to rotor 84. By throttling one or the other of ports 272 and 268 in this manner, a steering effect can be easily produced by causing a predominance of torque or force on one or the other of the traction units. This is particularly effective when the transmission is used in a so-called "crawler," as is contemplated, where steering is ordinarily accomplished by distributing the driving force or power unevenly between the tracks or traction units. By merely manipulating valve 58 the power can be directed to either motor, to both equally, or it can be divided between them in any proportion desired, and this is true with the tractor running in either direction as will be further explained.

Motors

Turning now to Figs. 1, 2, 10, 11, 12, 14, 15, 16 and 21, motor 60 as above described includes rotors 84 and 88 and corresponding stators 86 and 90. Inasmuch as the two sections of the motor are constructed and operate in a substantially identical manner it will be necessary to describe only one in detail. Rotor 88 is enclosed within above mentioned stator 90 and between an axle housing portion 300 and a dividing and port carrying casting or unit 302, a similar axle housing 304 adjoining above mentioned stator 86, axle housing 300, stator 90, dividing unit 302, stator 86, and axle housing 304, being secured rigidly together by means of suitable bolts or the like 306—306 to form a unitary rear axle structure for the tractor. Rotor 88 is splined or otherwise suitably fixed at 308 to an axle shaft 310 carried in an inboard bearing generally designated as 312, shaft 310 being fixed in driving relation with above mentioned traction wheel $W^2$ and supported in the usual outboard bearing 314. Rotation of rotor 88 accordingly causes corresponding rotation of wheel $W^2$ and, on the other hand rotation of wheel $W^2$ causes corresponding rotation of rotor 88 with certain results which will be explained. Substantially identical construction is used in connection with rotor 84, a shaft 316 beng carried in a bearing 318 and connected between rotor 84 and traction wheel $W^1$.

As best seen in Figs. 1, 2 and 11, rotor 88 is provided with a plurality of spaced radial slots 319—319, in which are slidably retained a series of vanes 320—320. Vanes 320—320 are pressed outwardly by means of springs 322—322 into sliding contact with the interior of above mentioned stator 90, it being understood that rotor 88 fits against a complementary surface 324 of axle housing 300 and against a surface 326 of dividing unit 302 in a substantially fluid-tight manner as also do vanes 320—320. Vanes 320—320 also fit in slots 319 in a fluid-tight manner while all of these several parts are at the same time freely movable in relation to each other. Stator 90 has an internal cam-like surface 228 against which vanes 320—320 are pressed by springs 322 so as to slide thereon as rotor 88 rotates. Cam surface 228 alternately approaches and recedes from rotor 88 so that vanes 320—320 are alternately pressed into and extended from slots 319. As will be apparent, this arrangement results in a series of chambers between the consecutive vanes and the rotor and stator and surfaces 324 and 326 respectively which alternately expand and contract as the rotor rotates. Pressure fluid is introduced into the expanding chambers and exhausted from the contracting chambers, resulting in an unbalanced pressure on the vanes which causes rotation of the rotor.

As seen best in Figs. 1, 10 and 11, passageway 82 communicates with a port 330 in the face of unit 302 which communicates with the spaces between vanes 320—320 where they are expanding during forward rotation. A passageway 332 forming a continuation of passageway 82 communicates with a port 334 also communicating with the spaces between vanes 320 where they are expanding during forward rotation of the parts. An exhaust port 336 communicates in similar manner with said spaces in the region where they are being contracted by the rotation of rotor 88 and connects by means of a passageway 338 (see also Fig. 12) with a port 340 communicating with another series of contracting spaces between vanes 320. Passageway 338 has a branch 342, Fig. 1, communicating with a fitting 344 which connects with a branch pipe 346 leading into above mentioned port 178 so as to deliver part of the spent fluid to the spaces between vanes 176 of pump rotor 66. Fitting 344 also communicates with a branch pipe 348 leading into above mentioned port 190 so as to deliver the rest of the spent fluid to the spaces between the vanes of pump rotor 64. It will now be apparent that the fluid is trapped in a closed circuit, or plurality of circuits, and travels back and forth between pump 52 and motor 60 so as to actuate the latter when power or energy is put into the former.

Motor stator 90, as hereinbefore indicated has an internal cam shape, a surface 349 being formed preferably on a true radius about the center of shaft 310 corresponding substantially with that of rotor 88. Stator 90 also has surface portions 350 and 352 formed preferably on a true radius about shaft 310, larger than the radius about which surface portion 349 is formed. Between surface portions 348 and 352 is a transitional or easement surface portion 354 merging with both surface portions 348 and 352. It will now be apparent that vanes 320, while traveling on surface portions 349 will not move relatively to rotor 88. Similarly, when traveling on surface portion 352 vanes 320 will remain stationary in relation to rotor 88. It will be further noted that, while vanes 320 are traveling on surface portion 354 so as to be forced inwardly relatively to rotor 88, exhaust port 340 is in communication with both sides of each vane so that there can be no differential of pressure on the two sides of any vane while it is sliding into its slot in rotor 88. The same is true of pressure port 334, which communicates with the space on both sides of each of vanes 320 when the latter are traveling on a surface portion 356 merging between above mentioned surface portion 352 and a surface portion 358. Thus although the pressure is comparatively high at this point it is equalized on the two sides of the vanes so they are not strained and cramped in the slots when moving out on surface portion 356. The pressure differential which does the driving is exerted on the vanes in contact with surface portion 352, which, as above stated, is formed on a true radius about shaft 310, the vanes being fully extended and receiving the full pressure on the side of port 334 and the exhaust pressure on the side of port 340. As heretofore stated vanes 320 do not move in slots 318 while traveling on surface portion 352, and this is the only region in which substantial circumferential thrust is exerted on the vanes. Since the vanes do not slide in the slots when under this thrust, there is no substantial wear, and the motor will have a satisfactory service life. A companion surface portion 360 is provided preferably diametrically opposite surface portion 352 between transitional surface portions 362 and 364 and which works with vanes 320 between ports 330 and 336 in a similar manner.

The provision of duplicate pressure ports, exhaust ports, surfaces 352 and 360 results in a substantially perfectly balanced rotor, and eliminates many of the difficulties heretofore experienced with vane type positive displacement motors in the past. The pressure entering through pressure port 330, as well as tending to rotate rotor 88, tends to push it backwardly and downwardly with a very substantial force, but a substantially identical force is developed by the pressure fluid entering through pressure port 334, tending to force rotor 88 in a forward and upward direction. Furthermore, the turning effort exerted on the vanes which are forwardly disposed at any instant, and which is exerted in a downward direction, is matched by a substantially equal upward force on the vanes which happen to be at the rear and receiving pressure fluid from port 334. Thus the resultant force on rotor 88, insofar as the hydraulic pressure is concerned is substantially pure tortion, there being no detrimental side thrust or extraneous load on bearings 312 and 318 caused by the action of motor 60.

Vanes 320 may be of a variety of constructions within the contemplation of the invention, but may advantageously be made of a portion 366, Figs. 31, 32 and 33, having a notched end 368 complementary to a notched end 370 of a portion 372, ends 368 and 370 being recessed as at 374 to receive springs 376 which tend to expand the vanes laterally as seen in Fig. 32 so as to fit surfaces 324 and 326, Fig. 11. Portion 366 has a recess 377 and portion 372 has a recess 378 for reception of above mentioned springs 322 in the same manner as vanes 320, and which serve to keep the vanes extended radially against the several surface portions of stator 60.

Since the whole structure operates substantially full of fluid it is necessary to vent the spaces within slots 319, since otherwise fluid therein would prevent movement of vanes 320. For this purpose a groove 380 is formed about one or both faces of rotor 88 communicating with all of slots 319, and, since the movements of the vanes in and out are preferably symmetrical and complementary, there is always fluid ready to follow an extending vane, and always a place for fluid in any slot 319 to go. This is accomplished without venting these spaces to exhaust pressure, which might cause undesired retracting of the vanes, or directly connecting them with high pressure, which might cause short circuiting of the pressure fluid through the slots. A pressure equalizing groove 382 is formed on the face of rotor 88 in contact with surface 324, and a similar groove 384 is formed on the face in contact with surface 326, these grooves being connected through rotor 88 by means of passageways 386 and connected into housing H by means of a connecting passageway as 387. In somewhat similar manner, a pressure equalizing passageway 388, Fig. 1, extends from the space above to the space below valve body 242, a drain passageway 390 leading from the lower space into housing H. Thus any seepage axially of the valve is drained away and does not develop any pressure tending to either raise or lower valve body 242.

*Venting and fluid replenishment*

Unavoidable slight leakage from pump unit 52 and from motor unit 60 also accumulates in housing H and is automatically returned to the circuit. As seen particularly in Figs. 18, 19 and 20, an auxiliary pump generally designated as 392 picks up the accumulated fluid from housing H and forces it into one or the other of pipes 54 and 56 or into fitting 344, as will appear. A suction chamber 394 spaced above the bottom of housing H has a filtering portion 396 through which fluid may flow to a suction tube 398 leading into pump body 400 in which are rotatable, intermeshed impeller rotors or gears 402 and 404. Rotor 404 is fixed on a shaft 406 which is driven at all times when pump unit 52 is in operation by means of a sprocket 408 actuated by a chain 410 in turn driven by a sprocket 412 forming in the present instance part of above mentioned gear 154. Pump body 400 may be supported in any suitable manner, but in the present instance is carried on a stud 414 engaged with a side of housing H by means of lock nuts 416—416. Rotors 402 and 404 transfer fluid from a suction chamber 418 to a discharge chamber 420 with the development of substantial pressure in the latter, and stud 414 is contemplated as being made hollow and connected to a tube 422 through which fluid may pass to any desired auxiliary fluid operated device, within the capacity of pump 392, such for example as a hydraulic power lift, servo mechanism or the like. Chamber 420 has a by-pass generally designated as 424 comprising a body portion 426 in the present instance constituting a cover for pump body 400, and providing a passageway 428 leading out of chamber 420 and communicating with a shouldered bore 430 in which is slidably received a plunger 432 pressed in one direction by a spring 434 retained by a closure 436. When the desired pressure has been attained in chamber 420, plunger 432 is pressed downwardly, compressing spring 434 until the upper end of plunger 432 uncovers a port 438 communicating with suction chamber 418. Fluid then passes through by-pass 424 from discharge chamber 420 to suction chamber 418, and the pressure in chamber 420 is prevented from rising to an undesirable value, but remains available at all times when pump unit 52 is running.

Chamber 420 has a plurality of outlets 440, 442 and 444, closed by non-return valve elements 446, 448 and 450 respectively. Outlet 442 communicates, through a fitting 452, Fig. 20 and pipe 454, Fig. 18 with above mentioned fitting 344, while outlet 440, in similar manner communicates through a pipe 456 with above mentioned pipe 56. Also similarly, outlet 444 communicates through a pipe 458 with above mentioned pipe 54. As will now be apparent, since in operation spent fluid will be returning to pumping unit 52 through fitting 344 or pipes 54 and 56, either the latter or fitting 344 will be carrying substantially zero pressure, and the pressure maintained in chamber 420 will be sufficient to displace one or another of valve elements 446, 448 or 450 so as to insure that whichever conduits are carrying spent fluid will be kept completely full at all times, and in fact under a slight positive pressure. As will be apparent, fluid under working pressure in pipes 54 and 56, or in fitting 344 during reverse operation, cannot get into chamber 420, since it is prevented by, and will serve only to more firmly seat whichever of valves 446, 448 or 450 is or are exposed to it.

In this way the fluid circuit is kept entirely full in spite of slight seepage, and negative pressures (below atmospheric) which would tend to cause infiltration of air into the low pressure passageways, are avoided.

Figs. 25 to 28 inclusive show a modification, the scale being somewhat reduced, which will have certain advantages under certain conditions of use such for example as cultivating. In this arrangement a pumping unit generally designated as 460, which may be identical with above described pumping unit 52, is driven from a tractor engine not shown, by means of a drive shaft 462, and impels fluid through a selector valve 464 from which it is distributed to a pair of fluid motors generally designated as 466 and 468 which are substantially identical, except for size, with motor 60 hereinbefore described, and being supplied with stators 470 and 472 within which operate rotors 474 and 476 respectively, (in a manner identical with that previously described). In this modification, however, rotor 474 is mounted on a drive shaft 478 carried in bearings 480 and 482 and driving, through a gear 484 a gear 486 on a stub axle 488 carried in bearings 500 and 502, the mechanism being carried in housings 504 and 506 providing a "drop axle" effect especially useful in cultivating tall crops which would be damaged by the center portion of common types of low rear axles. It will be understood that motor 468 is provided with a substantially identical drive shaft, gears and axle, and which have therefore been given the same numbers as the corresponding parts associated with motor 466.

While the last described arrangement does not avoid all gearing in the drive train, as does the previously described embodiment, it does eliminate all but the final drive gears which are quite rugged and trouble-free. It will be noted that motors 466 and 468 are arranged to rotate in directions opposite to their respective axles, and that they make several revolutions to one of their respective axles, the more rapid rotation tending to reduce the proportion of slip caused by unavoidable slight leakage through the motors. It will be understood that axles 488 have drive or traction wheels, and that the other essential parts of the tractor are of any suitable or well-known form.

Since the fluid in the fluid circuit will be continuously agitated, it is contemplated to include a cooling device in the circuit to dissipate any excessive amount of heat which may be generated.

As seen in Fig. 1, a seat 508 is carried on the tractor by means of a shock absorbing device of suitable type generally designated as 510 and which places an operator in a suitable position to actuate control bar 252, and a hinged detent 512 is provided on fitting 250 and which engages abutments 514 and 516 as valve 58 is turned by means of bar 252 into positions corresponding respectively approximately with Figs. 22 and 23, for directing all the power to the left, or to the right traction units, as the case may be. If it is desired to obtain the non-differential or solid axle effect, dentent 512 is rocked on its hinge and may enter a notch 518 in abutment 516 and permit additional movement of bar 252, placing valve 58 in the position indicated in Fig. 24.

*Operation*

The operation of the tractor and the various novel and advantageous features thereof are thought to be clear from the foregoing description, sufficient to say that the pumps and motors being of the positive displacement type, a nearly positive drive is established between the tractor engine and the traction units so that any serious slip or loss of efficiency is avoided. A braking effect is available by placing the pump unit in neutral, whereupon it can transmit substantially no fluid, while the motors, serving equally well as positive displacement pumps, cannot rotate if the fluid is prevented from circulating— as when it is blocked by the pumps. Control of the pumps affords a virtually continuous variation in ratio between a minimum or zero speed and a maximum.

This action takes place in a similar manner when running backward, valve 58 being interposed in what are then the exhaust passageways. However, although the fluid from both pumps is immediately mingled in manifold 78, the spent fluid from the two motors may be kept separated in valve 58. Since, as above stated, the motors and pumps are positive displacement units, a motor without torque resistance cannot run any faster than its exhaust fluid is accepted by its respective pump, since back pressure is built up in the outlet conduit if more fluid is passed than is taken by the pump. This back pressure will increase, if there is no resistance to rotation of the motor, until it virtually equals the pressure of the incoming fluid and prevents any flow through the free motor beyond that accepted by the pump. Pressure is therefore available for the other motor which does have torque resistance and the solid axle effect is realized as well during backward operation as it is in forward operation. The transmission incidentally provides a constant running power take-off and belt pulley, and the novel selector valve gives the effect of individual wheel brakes and clutches and in addition a solid axle effect.

Furthermore the arrangement provides a supply of fluid under pressure for auxiliary purposes.

The above being a complete description of an illustrative embodiment of the invention, what is claimed as new and desired to be secured by Letters Patent of the United States is:

1. In a self-propelled vehicle having a propelling engine and a plurality of traction units, the combination of a plurality of fluid pumps driven by the engine and corresponding to the number of traction units, a fluid driven motor individual to, and connected in actuating relation with each traction unit, a conduit individual to each pump, a conduit individual to each motor, a valve connected to said conduits and having a plurality of parts capable of a variety of adjusted positions, one of said parts being constituted, in one position of said parts, to freely intermingle the fluid from the pump conduits and divide it between the motor conduits for a differential driving effect, and another of said parts being constituted, in another position of said parts to connect one of said pump conduits with one of said motor conduits and another of said pump conduits with another of said motor conduits independently of the first-mentioned motor and pump conduits for driving the motors independently of each other for a solid axle effect between said traction units.

2. In a self-propelled vehicle having a propelling engine and a plurality of traction units, the combination of a plurality of fluid pumps driven by the engine and corresponding to the number of traction units, a fluid driven motor individual to, and connected in actuating relation with each traction unit, a conduit individual to each pump, a conduit individual to each motor, a valve casing connected to said conduits, a valve member in said casing and having a plurality of parts capable of a variety of adjusted positions, one of said parts being constituted, in one position of said parts, to freely intermingle the fluid from the pump conduits and divide it between the motor conduits for a differential driving effect, and another of said parts being constituted, in another position of said parts to connect one of said pump conduits with one of said motor conduits and another of said pump conduits with another of said motor conduits independently of the first-mentioned motor and pump conduits for driving the motors independently of each other for a solid axle effect between said traction units.

3. In a self-propelled vehicle having a propelling engine and a pair of traction units, the combination of a pair of fluid pumps driven by the engine, a fluid driven motor individual to, and connected in actuating relation with each traction unit, a conduit individual to each pump, a conduit individual to each motor, a valve connected to said conduits and having two interconnected parts capable of a variety of adjusted positions, one of said parts being constituted, in one position of said parts, to freely intermingle the fluid from the pump conduits and divide it between the motor conduits for a differential driving effect, and the other of said parts being constituted, in another position of said parts to connect one of said pump conduits with one of said motor conduits and the other of said pump conduits with the other of said motor conduits independently of the first-mentioned motor and pump conduits, for driving the motors independently of each other for a solid axle effect between said traction units.

4. In a self-propelled vehicle having a propelling engine and a pair of traction units, the combination of a pair of fluid pumps driven by the engine, a fluid driven motor individual to and connected in actuating relation with each traction unit, a conduit individual to each pump, a conduit individual to each motor, a valve casing connected to said conduits, a valve member rotatable in said casing and having two parts capable of a variety of adjusted position, one of said parts providing four interconnected ports registering, in one rotated position of said valve member, respectively with the pump conduits and the motor conduits whereby to interconnect them to freely intermingle the fluid from the pump conduits and divide it between the motor conduits for a differential driving effect, said part also providing imperforate portions, in another position disposed to block said conduits, and the other of said parts providing two independent unconnected passageways, disposed to connect, in another position of said parts, one of said pump conduits with one of said motor conduits and the other of said pump conduits with the other of said motor conduits independently of the first-mentioned motor and pump conduits, the last-mentioned position being that in which the first-mentioned part blocks said conduits, for driving the motors independently of each other for a solid axle effect between said traction units.

5. In a hydraulic tractor the combination of an engine, a dual hydraulic pump driven by the engine and having a pair of displacement chambers, each displacement chamber having means providing a first fluid conduit and a second fluid conduit, said pump being adjustable into one position in which said pump impels fluid from said first fluid conduits to said second fluid conduits, and into another position in which it impels fluid from said second fluid conduits to said first fluid conduits, a pair of fluid motors driven by fluid from said pump, a pair of traction elements connected in driven relation to said motors, means providing a first and a second fluid conduit connected with each of said motors, and means providing an enclosed passageway connecting the first conduit of one of said displacement chambers with the first conduit of one of said motors, and a separate enclosed passageway connecting the first conduit of the other displacement chamber with the first conduit of the other motor, and a third separate enclosed passageway interconnecting the second conduits of said displacement chambers and the second conduits of said motors.

6. In a self-propelled vehicle having a propelling engine and a pair of traction units, the combination of a pair of fluid pumps driven by the engine, a fluid driven motor individual to and connected in actuating relation with each traction unit, a conduit individual to each pump, a conduit individual to each motor, a valve casing connected to said conduits, a valve member rotatable in said casing and having two parts capable of a variety of adjusted positions, one of said parts providing four interconnected ports registering, in one rotated position of said valve member, respectively with the pump conduits and the motor conduits whereby to interconnect them to freely intermingle the fluid from the pump conduits and divide it between the motor conduits for a differential driving effect, said part also providing imperforate portions, in another position disposed to block said conduits, and the other of said parts providing two independent unconnected passageways, disposed in another position of said parts, to connect one of said pump conduits with one of said motor conduits and the other of said pump conduits with the other of said motor conduits independently of the first-mentioned motor and pump conduits, the last-mentioned position being that in which the first-mentioned part blocks said conduits, for driving the motors independently of each other for a solid axle effect between said traction units, the second mentioned part also having imperforate portions, in another position disposed to block said conduits, and said imperforate portions being related to each other in such a manner that, in one position of the valve member the conduits are blocked by the first-mentioned part while connected with the passageways in the other part, and in another position, the conduits are blocked by the imperforate portions of the other part while connected with the ports in the first-mentioned part.

7. In a self-propelled vehicle having a propelling engine and a pair of traction units, the combination of a pair of fluid pumps driven by the engine, a fluid driven motor individual to and connected in actuating relation with each traction unit, a conduit individual to each pump, a conduit individual to each motor, a valve casing connected to said conduits, a valve member rotatable in said casing and having two parts capable of a variety of adjusted positions, one of said parts providing four interconnected ports registering, in one rotated position of said valve member, respectively with the pump conduits and the motor conduits whereby to interconnect them to freely intermingle the fluid from the pump conduits and divide it between the motor conduits for a differential driving effect, said part also providing imperforate portions, in another position disposed to block said conduits, and the other of said parts providing two independent unconnected passageways, disposed in another position of said parts, to connect one of said pump conduits with one of said motor conduits and the other of said pump conduits with the other of said motor conduits independently of the first-mentioned motor and pump conduits, the last-mentioned position being that in which the first-mentioned part blocks said conduits, for driving the motors independently of each other for a solid axle effect between said traction units, the second mentioned part also having imperforate portions, in another position disposed to block said conduits, and said imperforate portions being related to each other in such a manner that, in one position of the valve member the conduits are blocked by the first-mentioned part while connected with the passageways in the other part, and in another position, the conduits are blocked by the imperforate portions of the other part while connected with the ports in the first-mentioned part and the imperforate portions of said second mentioned part being of an extent to provide for substantial rotation of said valve member while said conduits remain blocked thereby, and the ports in said first-mentioned part being enlarged and offset relatively to said motor conduits so that fluid flow to one of said motors, in another position of said valve member, may be restricted for a steering effect in one direction and in still another position, fluid flow to the other motor may be restricted for a steering effect in the opposite direction.

8. In a hydraulic tractor the combination of an engine, a dual hydraulic pump driven by the engine and having a pair of displacement chambers, each displacement chamber having means providing a first fluid conduit and a second fluid conduit, said pump being adjustable into one position in which said pump impels fluid from said first fluid conduits to said second fluid conduits, and into another position in which it impels fluid from said second fluid conduits to said first fluid conduits, a pair of fluid motors driven by fluid from said pump, said pump and motors being subject to leakage, a pair of traction elements connected in driven relation to said motors, means providing a first and a second fluid conduit connected with each of said motors, and means providing an enclosed passageway connecting the first conduit of one of said displacement chambers with the first conduit of one of said motors, and a separate enclosed passageway connecting the first conduit of the other displacement chamber with the first conduit of the other motor, a third separate enclosed passageway interconnecting the second conduits of said displacement chambers and the second conduits of said motors, a fluid reservoir positioned to collect said leakage, a makeup pump connected to receive fluid from said reservoir, a non-return valve opening into each of said enclosed passageways, and connections from said makeup pump through said non-return valves leading into said enclosed passageways.

References Cited in the file of this patent

UNITED STATES PATENTS

| | | |
|---|---|---|
| Re. 15,243 | Manly | Dec. 6, 1921 |
| 1,100,004 | Williams | June 16, 1914 |
| 1,156,818 | Rich | Oct. 12, 1915 |
| 1,176,307 | Manly | Mar. 21, 1916 |
| 1,590,226 | Boisset | June 29, 1926 |
| 1,772,247 | Forrester et al. | Aug. 5, 1930 |
| 2,254,358 | Frudden et al. | Sept. 2, 1941 |
| 2,276,895 | Vosseler et al. | Mar. 17, 1942 |
| 2,312,886 | Ellinwood | Mar. 2, 1943 |
| 2,330,565 | Eckart | Sept. 28, 1943 |
| 2,355,669 | Moser | Aug. 15, 1944 |
| 2,357,334 | Kendrick et al. | Sept. 5, 1944 |
| 2,393,324 | Joy | Jan. 22, 1946 |
| 2,446,242 | Orshansky | Aug. 3, 1948 |
| 2,458,985 | Ferris et al. | Jan. 11, 1949 |
| 2,499,563 | Bill | Mar. 7, 1950 |
| 2,570,411 | Vickers | Oct. 9, 1951 |

FOREIGN PATENTS

| | | |
|---|---|---|
| 98,581 | Sweden | Apr. 9, 1940 |